(12) United States Patent
McMillian et al.

(10) Patent No.: US 6,229,814 B1
(45) Date of Patent: May 8, 2001

(54) DIGITAL SWITCH-RESISTANT MULTI-CIRCUIT LINE CARD PROVIDING DIRECT CONNECTION TO REMOTE TERMINAL

(75) Inventors: Lonnie S. McMillian, Madison; W. Stuart Venters; Michael Scott Sansom, both of Huntsville, all of AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 08/951,527

(22) Filed: Oct. 16, 1997

(51) Int. Cl.[7] .................................................... H04L 12/56
(52) U.S. Cl. ............................ 370/420; 370/463; 370/400
(58) Field of Search ................................... 370/419, 420, 370/422, 423, 466, 524, 537, 463; 703/23, 24, 25, 26, 27, 28; 379/399

(56) References Cited

U.S. PATENT DOCUMENTS

| | | | |
|---|---|---|---|
| 4,852,160 | * 7/1989 | Kiko et al. | 379/405 |
| 5,202,919 | * 4/1993 | Kiko | 379/399 |
| 5,680,391 | * 10/1997 | Barron et al. | 370/241 |
| 5,940,388 | * 8/1999 | Nahar et al. | 370/359 |
| 5,943,404 | * 8/1999 | Sansom et al. | 379/93.06 |
| 5,999,725 | * 12/1999 | Barbier et al. | 395/500.49 |
| 6,018,529 | * 1/2000 | Toth | 370/463 |

* cited by examiner

Primary Examiner—Mark Zimmerman
Assistant Examiner—Enrique L Santiago
(74) Attorney, Agent, or Firm—Allen, Dyer, Doppelt, Milbrath & Gilchrist, P.A.

(57) ABSTRACT

A multi-circuit emulating line card is installable in a single line card slot of the backplane of digital switch, and is configured to emulate the functionality of each of a plurality of digital switch line cards, respectively associated with plural digital subscriber circuits served by the switch. In the course of emulating these plural line cards, the multi-circuit line card provides connectivity between each digital subscriber circuit and a digital carrier communication link to plural digital subscriber loop circuits, such as BRITE cards of a remote terminal site. The line card of the invention also includes network and subscriber circuit-associated metallic link impedance simulation circuits for terminating a metallic test bus.

19 Claims, 2 Drawing Sheets

DIGITAL SWITCH-RESISTANT MULTI-CIRCUIT LINE CARD PROVIDING DIRECT CONNECTION TO REMOTE TERMINAL

FIELD OF THE INVENTION

The present invention relates in general to communication systems, in particular digital loop carrier (DLC) networks, and is directed to a new and improved line card installable in a single card slot of the backplane of a digital switch serving a central office. The multi-circuit line card of the invention is configured to emulate a plurality of digital switch line cards, respectively associated with a plurality of digital subscriber circuits served by the switch, and is operative to provide connectivity between such digital subscriber circuits and a digital carrier communication link to plural digital subscriber loop circuits of a remote terminal site.

BACKGROUND OF THE INVENTION

In order to extend digital service to customer premises equipment (CPE) served by a remote terminal (RT), telephone networks customarily employ a digital loop carrier (DLC) system, such as Ti carrier system for time division multiplexed data format (e.g., Bellcore standard TR-NWT-000397) diagrammatically illustrated in FIG. 1. In this 'universal' type of DLC system, opposite ends of the digital carrier communication link (the T1 link) 10 are coupled to a central office terminal (COT) 12 and a remote terminal (RT) 14, respectively. For multiplexing and demultiplexing digital traffic conveyed over the T1 carrier link 10 with digital subscriber loops (DSL)s 21 of an associated switch 20 (such as an AT&T 5ESS switch), the central office terminal 12 may contain a plurality of digital loop carrier circuits 13, such as basic rate interface transmission extender cards, commonly referred to as BRITE cards or U-BRITE cards. Each BRITE card 13 is coupled over a respective DSL 21 to one of a plurality of line cards 23 of the switch 20. In a complementary manner, the remote terminal 14 may contain a plurality of BRITE cards 15, respectively associated with DSLs 16 serving respective CPEs.

For digital switch applications, the digital subscriber loops 21 between the switch 20 and the COT 12 become superfluous and may therefore be eliminated by terminating the carrier link to the remote terminal with the switch. For this purpose, two Bellcore 'integrated' digital loop carrier systems—TR-NTW-0008 and GR-CORE-303—have been proposed. The purpose of these systems is to reduce the cost per subscriber (by eliminating the subscriber loops between the switch and the COT), and to increase bandwidth efficiency by concentration at the carrier facilities.

However, each has its shortcomings. First of all, the TR-NTW-0008 system does not provide for deployment of ISDN signalling. Secondly, the GR-CORE-303 system, which does deploy ISDN, involves a substantial modification of the configuration of the switch, requiring a substantial capital investment, that is passed on to the subscriber in the form of higher costs (which become prohibitive in areas of low subscriber density).

SUMMARY OF THE INVENTION

In accordance with the present invention, this problem is solved by a new and improved line card that is installable in a digital switch serving a central office, and is operative to emulate or 'mimic' the functionality of each of a plurality of digital switch line card circuits, that are respectively associated with a plurality of digital subscriber circuits served by the switch. In the course of emulating these plural line cards, the multi-circuit line card configuration of the invention provides connectivity between each digital subscriber circuit and a digital carrier communication link to plural digital subscriber loop circuits of a remote terminal site. Because it is installable in an individual one of the backplane card slots of the switch, the multi-circuit line card of the invention provides a substantial decrease in hardware, and therefore reduces the cost associated with providing ISDN service to low subscriber density areas.

As will be described, the multi-circuit line card according to the present invention comprises a card processor-controlled digital switch backplane interface, that is made up of a plurality of backplane interface circuits—one for each (replaced) line card to be emulated. As the processor steps through or scans the backplane interface circuits, each circuit is operative to interface digital subscriber loop (DSL) signals (such as ISDN signals) and control signals with the respective signalling and control bus portions of the switch backplane.

For outgoing DSL signals from associated subscriber loops, a respective backplane interface circuit extracts the DSL data signals from the backplane and supplies a response to the switch over the backplane control bus. In the incoming direction, DSL signals for associated subscriber loops from the T1 carrier link are controllably placed onto the backplane data bus.

To link DSL signals to and from the (T1) digital carrier link, each backplane interface circuit is coupled to a respective data format circuit of a data format interface. Each data format circuit formats DSL data in accordance with a prescribed time division multiplexed data format (such as the above-mentioned Bellcore standard TR-NWT-000397) for application to the digital carrier link by a digital carrier interface (multiplexer—demultiplexer). At the remote terminal, the respective ISDN subscriber channels transported by the carrier data stream are converted into plural ISDN subscriber loops for delivery to their associated CPE circuits. In the incoming direction from the T1 link, each data format circuit extracts the DSL signals from the (TR 397) formatted data from the digital carrier interface and couples the DSL signals to an associated backplane interface circuit.

In order to create the appearance of the presence of a network or customer interface to tip and ring leads of a metallic test bus, the multi-circuit line card of the present invention further includes selectively connectable network and subscriber circuit-associated metallic link impedance simulation circuits. Each impedance simulation circuit may comprise a resistor-capacitor network, that is controllably configured by the card's control processor to provide a prescribed test bus termination impedance. The metallic link simulation circuits serve to replicate loop impedance signatures that would normally be presented by each replaced or phantom subscriber loop circuit between the switch and the central office terminal. This feature enables the multi-circuit line card of the invention to appear to the switch as a plurality of subscriber loops that had been extended through the conventional use of a universal digital loop carrier system containing central office terminal and remote terminal hardware.

DETAILED DESCRIPTION

Figure 1:
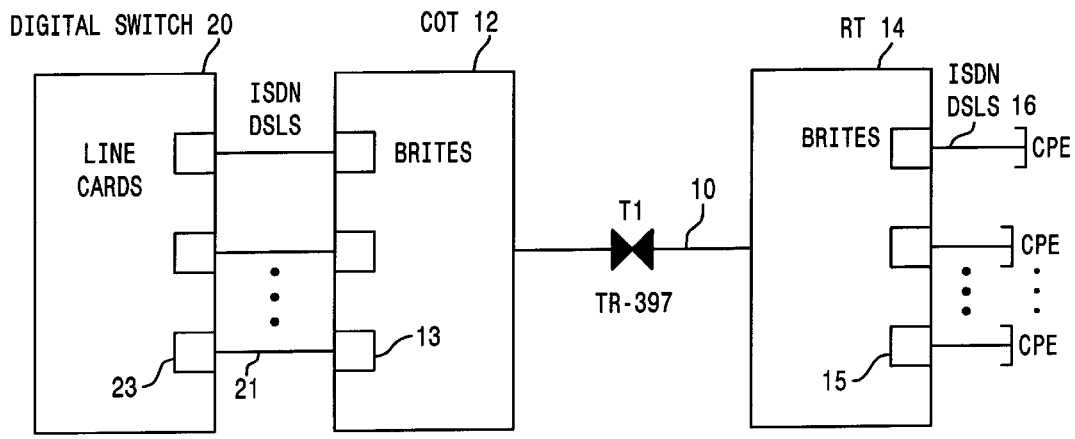
FIG. 1 diagrammatically illustrates a conventional digital loop carrier system.

Before describing in detail the multi-circuit line card of the present invention, it should be observed that the invention resides primarily in what is effectively a prescribed arrangement of conventional communication circuits and associated digital signal processing components and an attendant supervisory control program therefor, that controls the operations of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein.

Thus, the block diagram illustrations to be described are primarily intended to show the major components of the system in a convenient functional grouping and processing sequence, whereby the present invention may be more readily understood.

Figure 2:
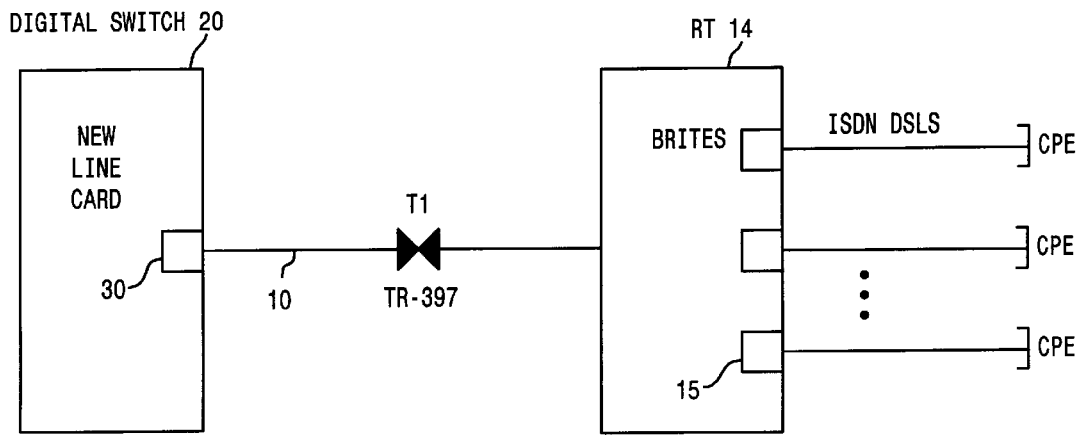
FIG. 2 diagrammatically illustrates a digital loop carrier system containing a digital switch contains the multi-circuit line card according to the invention.
Figure 3:
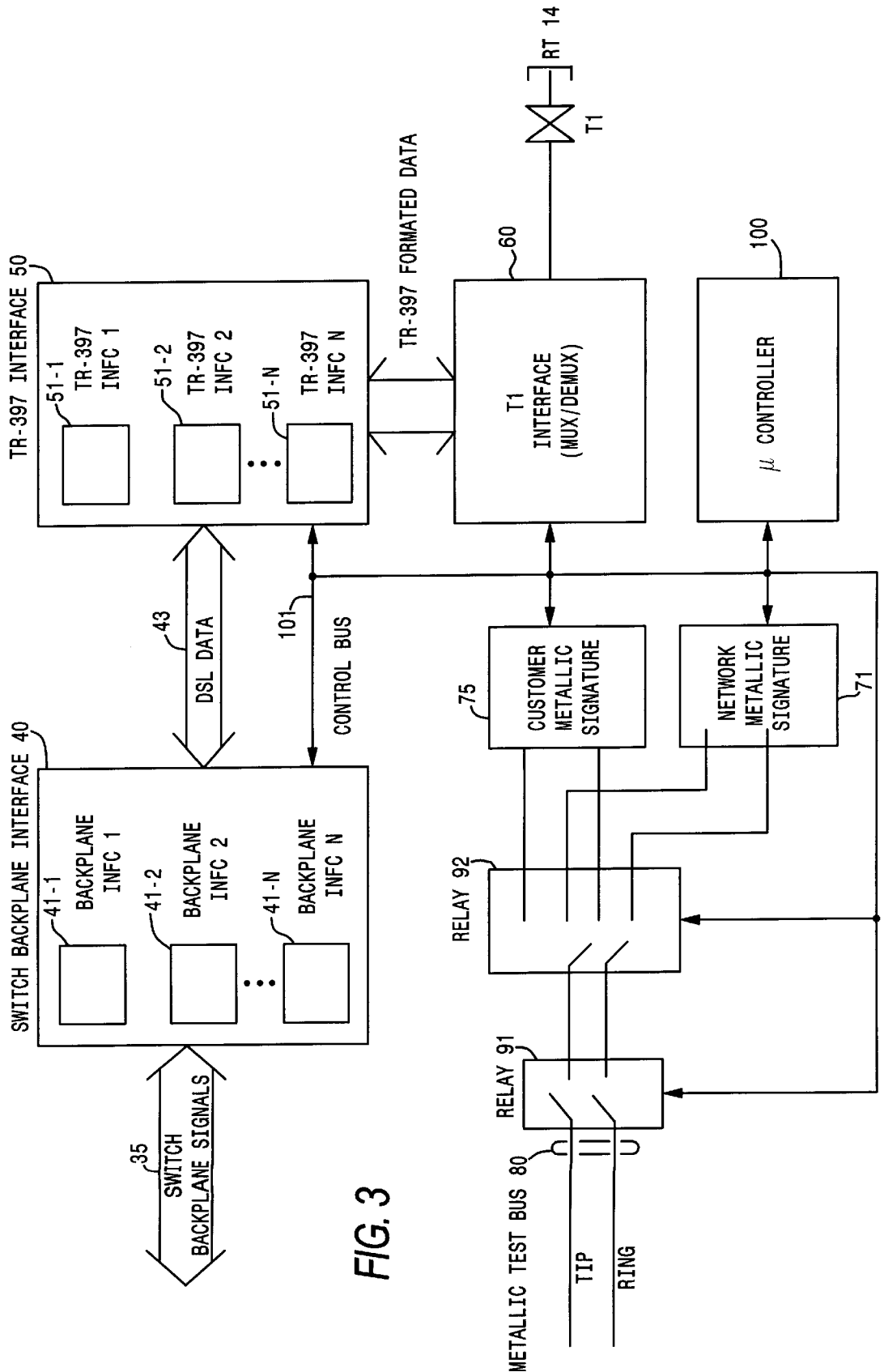
FIG. 3 diagrammatically illustrates the configuration of a multi-circuit line card according to the present invention.

FIG. 2 diagrammatically illustrates a digital loop carrier system of the type shown in FIG. 1, in which a plurality of the lines cards 23 of the digital switch 20 have been replaced by a single multi-circuit line card 30 according to the present invention, a detailed diagram of which is shown in FIG. 3, to be described. Multi-circuit line card 30 is preferably implemented as a gate array-configured application specific integrated circuit (ASIC) and is installable in a single backplane card slot of the switch 20. Respective (virtual) line card interface functions that are executed by a set or plurality of interface and formatting circuits are operative to provide direct digital signalling connectivity between a plurality of digital subscriber circuits served by the switch 20 and the (T1) digital carrier communication link 10, a far or geographically remote end of which is terminated at the remote terminal 14. As noted earlier, because it is installable in an individual one of the backplane card slots of the digital switch 20, multi-circuit line card 30 provides a substantial reduction in switch hardware, and therefore a decrease in cost associated with providing ISDN service to low subscriber density areas.

For this purpose, as diagrammatically illustrated in FIG. 3, in order to appear to the switch backplane as a plurality of installed line card circuits, by (virtually) replicating the digital signalling interface functionality of a plurality of line card circuits that it replaces, the multi-circuit line card of the invention comprises a digital switch backplane interface 40, comprised of a plurality of backplane interface circuits 41-1, 41-2, . . . , 41-N (where N=8 as a non-limiting example). Each backplane interface circuit 41 is preferably a gate array replication of the DSL signal coupling functionality of a standard (replaced) line card, that interfaces digital subscriber loop (DSL) signals (such as but not limited to ISDN signals) and control signals with the respective signalling and control bus portions of the switch backplane, via backplane bus 35. Being virtual backplane interface circuits, rather than line cards physically installed in respective card slots of the switch backplane, allows each backplane interface circuit 41 to be individually programmable relative to any DSL time slot/card slot assignment.

Backplane interface 40 and other components of the multi-circuit line card are controlled by a card control processor (microcontroller) 100, with associated control signals being linked to the various circuit components of the card by way of a control bus 101. The processor 100 is programmed to step through or scan the backplane interface circuits, in response to which digital subscriber loop (DSL) signals (such as ISDN signals) and control signals are interfaced with the respective signalling and control bus portions of the switch backplane.

For outgoing DSL signals from associated subscriber loops, each backplane interface circuit 41-i is operative, under processor control, to extract their DSL data signals from the backplane and to generate a response to the switch over the backplane control bus. Conversely, as incoming DSL signals for delivery to associated subscriber loops are received from the T1 carrier link, and controllably placed onto the backplane data bus, the associated interface circuit 41-i signals the switch over the backplane control bus.

To perform data interface functionality for both replaced line cards of the switch and BRITE cards of the central office terminal, each backplane interface circuit 41 is configured to execute, under processor control, embedded operations channel (EOC) processing that would be performed by the BRITE cards, so that the multi-circuit line card may process messages having an address of '1' or a broadcast address.

For linking DSL signals to and from the (T1) digital carrier link 10, each backplane interface circuit 41-i is coupled over a DSL data bus 43 to a respective data format circuit 51-i of a data format interface 50. Like the respective backplane interface circuits 41, each data format circuit 51 is preferably configured as a gate array replication of data format conversion functionality of a standard (replaced) BRITE card, that formats DSL data supplied thereto from the DSL data bus 43, in accordance with a prescribed time division multiplexed data format (such as Bellcore standard TR-NWT-000397 data format, as a non-limiting example that provides for the transport of ISDN data), for application to the digital carrier link 10, by way of a digital carrier interface 60. (At the remote terminal 14, the respective ISDN subscriber channels transported by the TR 397formatted carrier data stream are converted into plural ISDN subscriber loops for delivery to their associated CPE circuits).

The digital carrier communication link interface 60 comprises a digital signal packet multiplexer—demultiplexer, that is operative, under the control of processor 100, to multiplex and demultiplex the (TR 397) formatted digital data communication signals with respect to the digital carrier communication link 10.

In the incoming direction from the T1 link 10, each data format circuit 51 is operative to extract the DSL signals from the (TR 397) formatted data as received over formatted data bus 61 from the digital carrier interface and to couple the DSL signals over the data bus 43 to an associated backplane interface circuit 41.

The multi-circuit line card further includes respective network and subscriber circuit-associated metallic link impedance simulation circuits 71 and 75. The purpose of these circuits is to 'spoof' the switch, by creating the appearance of the presence of a network or customer interface to tip and ring leads of a metallic test bus 80, and thereby satisfy the switch's need to see reasonable loop parameters that look like the signature of a network or customer termination.

For this purpose, each metallic link impedance simulation circuit may comprise a resistor-capacitor network, that is controllably configured by the card's control processor 100 to provide a prescribed test bus termination impedance. The tip and ring leads of the metallic test bus 80 are selectively coupled to the impedance simulation circuits 71 and 75 by means of cascaded relay circuits 91 and 92 installed therebetween. Each relay circuit is selectively switched by control processor 100 to provide a switchable circuit path between the tip and ring leads of the test bus 80 and each of the selectively controlled impedance simulation circuits 71 and 75.

Thus, the metallic link simulation circuits 71 and 75 serve to replicate the corresponding impedance signatures that would normally be presented by each replaced ('phantom') subscriber loop circuit between the switch and the central office terminal. This feature enables the multi-circuit line card of the invention to satisfy the switch, by appearing as a plurality of digital (e.g., ISDN) subscriber loops, that had been extended through the conventional use of a universal digital loop carrier system containing both central office terminal and remote terminal hardware, as described previously.

As will be appreciated from the foregoing description, the above discussed desire to eliminate what are effectively superfluous digital subscriber loops between a digital switch and a central office terminal, by terminating the digital carrier link to the remote terminal directly with the switch, yet without imposing a substantial cost penalty on the subscriber, is successfully addressed by the multi-circuit line card of the invention, which is installable in a single card slot of digital switch and is operative to effectively mimic the functionality of each of a plurality of digital switch line card circuits it replaces. In emulating the replaced line cards, the multi-circuit line card configuration of the invention provides connectivity between each digital subscriber circuit and a digital carrier communication link to plural digital subscriber loop circuits of a remote terminal site. Because it is installable in an individual one of the backplane card slots of the switch, the multi-circuit line card of the invention provides a substantial decrease in hardware, and therefore reduces the cost associated with providing ISDN service to low subscriber density areas.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. In a digital switch associated with a first terminal site of a communication network, said digital switch being operative to provide connectivity between a plurality of digital subscriber circuits coupled thereto and a digital carrier communication link connected to a remote terminal site, said remote terminal site having a plurality of digital subscriber connection circuits serving respective digital subscriber loops connected thereto, the improvement comprising a multi-circuit line card installable in said digital switch and being configured to emulate a plurality of digital switch line card circuits, respectively associated with said plurality of digital subscriber circuits, and providing connectivity, over said digital carrier communication link, between each of said digital subscriber circuits and said plurality of circuits of said remote terminal site, and thereby providing digital communication service for said respective digital subscriber loops.

2. The improvement according to claim 1, wherein said multi-circuit line card comprises:
   a digital switch backplane interface having a plurality of backplane interface circuits coupled to interface digital subscriber loop data signals with said plurality of digital subscriber circuits, and
   a digital carrier communication link interface coupled with said digital switch backplane interface and said digital carrier communication link, and having a plurality of digital communication interface circuits coupled to interface said digital subscriber loop data signals between said digital switch backplane interface and said digital carrier communication link.

3. The improvement according to claim 1, wherein said digital subscriber loop signals comprise integrated service digital network communication signals.

4. The improvement according to claim 1, further including metallic link interface circuits for selectively terminating a metallic test bus.

5. The improvement according to claim 1, wherein said digital carrier communication link interface is configured to multiplex and demultiplex digital data communication signals with respect to said digital carrier communication link.

6. The improvement according to claim 5, wherein said digital data communication signals comprise Bellcore standard ISDN signals.

7. The improvement according to claim 5, wherein said digital data communication signals comprise TR-NWT-000397 formatted ISDN signals.

8. A multi-circuit line card adapted to be installed in a line card slot of a backplane of a digital switch, and being operative to replace a plurality of digital switch line cards that would otherwise be installed in respective line card slots of said backplane, said digital switch being associated with a first terminal site of a communication network and being operative to provide connectivity between a plurality of digital subscriber circuits coupled thereto and a digital carrier communication link connected to a remote terminal site, said multi-circuit line card comprising:
   a backplane interface configured to emulate said plurality of digital switch line card circuits, respectively associated with said plurality of digital subscriber circuits; and
   a digital carrier communication link interface, coupled to said a backplane interface, and being operative to effect digital carrier communication connectivity over said digital carrier communication link between each of said plurality of digital subscriber circuits coupled to said digital switch and said remote terminal site, so as to provide digital communication service between said respective digital subscriber loops served thereby and said plurality of digital subscriber circuits coupled to said digital switch.

9. The multi-circuit line card according to claim 8, wherein said backplane interface contains a plurality of backplane interface circuits, each of which is associated with a respective line card replaced by said multi-circuit line card, and is operative to interface digital subscriber loop (DSL) signals and control signals with respective signalling and control bus portions of said backplane.

10. The multi-circuit line card according to claim 9, wherein said digital carrier communication link interface contains a plurality of digital carrier communication link interface circuits, each of which is associated with a respective one of said backplane interface circuits, and is operative to format said DSL signals in accordance with a prescribed time division multiplexed data format for application to said digital carrier communication link.

11. The multi-circuit line card according to claim 10, wherein said digital carrier communication link interface includes a multiplexer—demultiplexer, coupled to said plurality of digital carrier communication link interface circuits, and being operative to provide time division multiplexed digital communication connectivity of formatted DSL signals over said digital carrier communication link with said remote terminal.

12. The multi-circuit line card according to claim 8, further including metallic link interface circuits for selectively terminating a metallic test bus.

13. The multi-circuit line card according to claim 12, wherein said metallic link interface circuits comprise selectively connectable network and subscriber circuit-associated metallic link impedance simulation circuits, which are controllably connectable to a metallic test bus, so as to appear to said switch as a plurality of subscriber loops extended through a digital loop carrier system containing both central office terminal and remote terminal hardware.

14. The multi-circuit line card according to claim 9, wherein said digital subscriber loop signals comprise integrated service digital network communication signals.

15. The multi-circuit line card according to claim 8, wherein said digital subscriber loop signals comprise Bellcore standard ISDN signals.

16. The multi-circuit line card according to claim 11, wherein said formatted DSL signals comprise TR-NWT-000397 formatted ISDN signals.

17. A multi-circuit line card adapted to be installed in a line card slot of a backplane of a digital switch, and being operative to replace a plurality of digital switch line cards that would otherwise be installed in respective line card slots of said backplane, said digital switch being associated with a first terminal site of a communication network and being operative to provide digital communication connectivity between a plurality of digital subscriber circuits coupled thereto and a digital carrier communication link connected to a remote terminal site, said multi-circuit line card comprising:

a digital backplane interface configured to emulate said plurality of digital switch line cards and appear to said digital switch as a plurality of digital switch line cards, respectively associated with said plurality of digital subscriber circuits served by said digital switch; and a digital carrier communication link interface, coupled to said digital backplane interface, and being operative to extract digital subscriber loop (DSL) data signals provided by said digital backplane interface for application to said digital carrier communication link in accordance with a prescribed time division multiplexed data format, so as to effect digital carrier communication connectivity over said digital carrier communication link between each of said plurality of digital subscriber circuits coupled to said digital switch and said remote terminal site, and thereby provide digital communication service between said respective digital subscriber loops served thereby and said plurality of digital subscriber circuits coupled to said digital switch.

18. The multi-circuit line card according to claim 17, wherein said digital carrier communication link interface is operative to extract digital subscriber loop (DSL) data signals provided by said digital backplane interface for application to said digital carrier communication link as TR-NWT-000397 formatted ISDN signals.

19. The multi-circuit line card according to claim 17, further including metallic link simulation circuits that are operative to replicate impedance signatures that would normally be presented by respective ones of replaced digital switch line card emulated by said digital backplane interface.

* * * * *

UNITED STATES PATENT AND TRADEMARK OFFICE
CERTIFICATE OF CORRECTION

PATENT NO.   : 6,229,814 B1  
DATED        : May 8, 2001  
INVENTOR(S)  : Lonnie S. McMillian, W. Stuart Venters, Michael Scott Sansom It is certified that error appears in the above-identified patent and that said Letters Patent is hereby corrected as shown below:

Title page,
Item [54], delete "RESISTANT" and insert -- RESIDENT --

Column 1,
Line 1, delete "RESISTANT" and insert -- RESIDENT --
Line 24, delete "Ti" and insert -- T1 --

Column 3,
Line 32, delete "the lines cards" and insert -- the line cards --

Column 4,
Line 43, delete "TR 397format-" and insert -- TR 397 format- --

Signed and Sealed this

Eighth Day of January, 2002

*Attest:*

*Attesting Officer*

JAMES E. ROGAN  
*Director of the United States Patent and Trademark Office*